United States Patent [19]

Mauthe

[11] Patent Number: 4,616,303
[45] Date of Patent: Oct. 7, 1986

[54] CIRCUIT FOR VOLTAGE MULTIPLICATION

[75] Inventor: Manfred Mauthe, Munich, Fed. Rep. of Germany

[73] Assignee: Siemens Aktiengesellschaft, Berlin & Munich, Fed. Rep. of Germany

[21] Appl. No.: 624,348

[22] Filed: Jun. 25, 1984

[30] Foreign Application Priority Data

Sep. 29, 1983 [DE] Fed. Rep. of Germany ....... 3335423

[51] Int. Cl.⁴ ............................................. H02M 3/18
[52] U.S. Cl. ...................................... 363/60; 307/110; 320/1
[58] Field of Search ....................... 363/59, 60, 69, 70; 307/110; 320/1

[56] References Cited

U.S. PATENT DOCUMENTS

| 3,944,908 | 3/1976 | Oki | 363/60 |
| 4,199,806 | 4/1980 | Patterson, III | 363/80 |
| 4,344,003 | 8/1982 | Harmon et al. | 363/60 |
| 4,559,483 | 12/1985 | Jundt et al. | 363/61 |

OTHER PUBLICATIONS

IEEE Journal of Solid State Circuits, vol. SC-17, No. 4, Aug. 1982, pp. 778-781.

Primary Examiner—Peter S. Wong
Assistant Examiner—Judson H. Jones
Attorney, Agent, or Firm—Hill, Van Santen, Steadman & Simpson

[57] ABSTRACT

A circuit for voltage multiplication has a capacitor which is connectible via first switching transistors to a supply voltage source and via further first switching transistors in series with the supply voltage source and with a storage capacitor which is connected in parallel to the circuit output. Clock voltages for driving the first switching transistors are switchable in amplitude from a value corresponding to the supply voltage to the value corresponding to the output voltage. In order to achieve high efficiency of the circuit, a clock voltage generator is controllable for amplitude switch over via a supply line which is connectible via a second switching transistor to the supply voltage source and is connectible via a third switching transistor to the circuit output, whereby these switching transistors are driven via the outputs of the comparator which compares the supply voltage to the output voltage. The circuit may advantageously be employed in hearing aid circuits.

5 Claims, 3 Drawing Figures

CIRCUIT FOR VOLTAGE MULTIPLICATION

BACKGROUND OF THE INVENTION

1. Field of the Invention

The present invention relates to a circuit for voltage multiplication in which a capacitor is connectible via first switching transistors to a supply voltage source and connectible via further first switching transistors in series with the supply voltage source and with a storage capacitor connected parallel to a circuit output, and in which a clock voltage generator drives the first switching transistors and is switchable with respect to the clock voltage amplitude from a value corresponding to the supply voltage to a value corresponding to the output voltage.

2. Description of the Prior Art

A circuit of the type generally set forth above is known from the IEEE Journal of Solid State Circuits, Vol. SC-17, No. 4, August 1982, pp. 778-781. In this circuit, the clock voltage generator which supplies the clock voltage for generating the switching transistors is only connected to the supply voltage as long as the output voltage does not exceed the supply voltage. When, however, the output voltage is greater than the supply voltage, the clock voltage generator is switched from the latter to the former, so that the clock voltages alternate about 0 volts and the amplitude of the output voltage. This is necessary in order to prevent the efficiency of the circuit from being too greatly reduced due to incompletely inhibited switching transistors. A disconnection of the clock voltage generator from the supply voltage thereby occurs by way of a diode which is disposed in series with the supply voltage input. It is therefore disadvantageous that a supply voltage drops off at the diode operated in the on state, the effective supply voltage being thereby reduced. This is particularly disruptive when the supply voltage is relatively low, since the efficiency of the circuit is therefore reduced to a correspondingly high degree.

SUMMARY OF THE INVENTION

The object of the present invention is to provide a circuit of the type generally set forth above wherein the aforementioned disadvantage does not occur.

According to the invention, the above object is achieved in a circuit of the type described, in that the clock voltage generator is controllable via a supply line for the amplitude switch over of the clock pulse voltage driving the first switching transistors, and in that the supply line is connectible via a second switching transistor to the supply voltage source and is connectible via a third switching transistor to the circuit output, whereby the gate of the second switching transistors and the gate of the third switching transistor are connected to respective outputs of a comparator whose inputs are connected with the supply voltage source and the circuit output.

The advantage which may be attained in practicing the present invention is that the full supply voltage is available for the operation of the voltage multiplying circuit portion and that, simultaneously, a reliable drive of the switching transistors and, in particular, a reliable inhibition thereof, is guaranteed.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
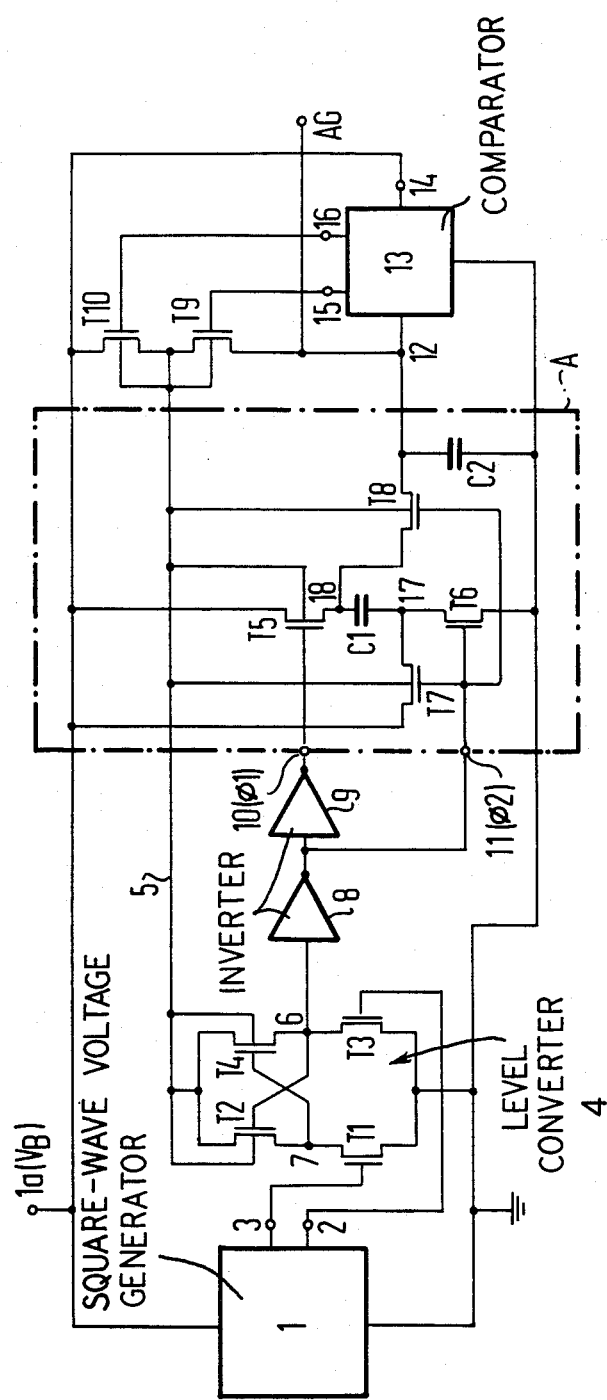
FIG. 1 is a schematic representation of a preferred embodiment of the invention constructed in complementary-metal-oxide-semiconductor (CMOS) technology.

Referring to FIG. 1, a square-wave voltage generator 1, charged with a supply voltage $V_B$, is illustrated. The square-wave voltage generator 1 emits a square-wave voltage alternating between a reference potential, here ground, and the supply voltage $V_B$ at a first output 2 and a square-wave voltage inverted with respect thereto at a second output 3. A level converter 4 comprises a switching branch including two transistors T1 and T2 connected in series with one another between a supply line 5 and the reference potential and a second switching branch parallel to the first switching branch and including series-connected switching transistors 53 and 54. The transistors T2 and T4 are thereby designed as p-channel transistors, whereas the transistors T1 and T3 are designed as n-channel transistors. The gate of the transistor T2 is connected to the junction 6 of the transistors T3 and T4, whereas the gate of the transistor T4 is connected to the junction 7 of the transistors T1 and T2. As illustrated, the gate of the transistor T1 is connected to the output 3 of the square-wave voltage generator and the gate of the transistor T3 is connected to the output 2 of the square-wave voltage generator.

The junction 6 is connected to an input of a first inverter 8 which is followed by a second inverter 9. The output of the inverter 9 is connected to a first clock input 10 of a circuit portion A bounded by a dot-dash line. The output of the inverter A is connected to a second clock input 11 of the circuit portion A. The circuit portion A comprises a capacitor C1 having a first terminal 18 connected to the supply voltage $V_B$ via a p-channel switching transistor T5 and a second terminal 17 connected to the reference voltage via an n-channel switching transistor T6. Further, the second terminal of the capacitor C1 is also connected to the supply voltage $V_B$ via a p-channel switching transistor T7 and the first-mentioned terminal of the capacitor C1 is connected via a p-channel switching transistor T8 to a first terminal of a storage capacitor C2 whose second terminal is connected to the reference potential. The gate of the transistor T5 is connected to the clock input 10, whereby the gates of the transistors T6, T7 and T8 are connected to the clock input 11. The first terminal of the capacitor C2, which also forms the circuit output AG, is connected to a first input 12 of a comparator 13, the comparator 13 having a second input 14 connected to the supply voltage $V_B$. The gate of a switching transistor T9 is connected and driven by a first output 15 of the comparator 13 and the gate of a switching transistor T10 is connected to and driven via a second output 16 of the comparator 13. The source-drain segment of the transistor T9 thereby connects the supply line 5 to the circuit output AG and the source-drain segment of the transistor T10 connects the supply line 5 to the supply voltage $V_B$.

As already indicated, mutually-inverted square-wave voltages which respectively alternate between 0 volts and a voltage $+V_B$ are tapped at the outputs 2 and 3 of the square-wave voltage generator 1. When the output 3 is at 0 volts and the output 2 is at the voltage $+V_B$ in the first half $T_{P1}$ of a clock period $T_P$, then the transistor T1 blocks and the transistor T3 is conductive. The junction 6, as well as the gate of the transistor T2 are therewith pulled down to 0 volts, the consequence thereof being that the transistor T2 which, of course, is designed as a p-channel transistor, becomes conductive. The junction 7 is thereby connected to the potential of the supply line 5 which is still connected to the supply voltage $V_B$ via the conductive transistor T10 (given an inhibited transistor T9). The p-channel switching transistor T4 is therefore in its inhibited condition. In the second half $T_{P2}$ of the clock period $T_P$, the output 2 lies at 0 volts and the output 3 is at the voltage $+V_B$. The junction 7 is thus drawn down to 0 volts, so that the transistor T4 becomes conductive, the junction 6 is boosted to the potential of the supply line 5, i.e. the voltage $+V_B$ in this case, and the transistor T2 is inhibited. As a result, at the junction 6 a square-wave voltage is available which alternates between the respective voltage at the supply line and 0 volts in the clock of the square-wave voltages at the outputs 2 and 3. This square-wave voltage is supplied to the clock input 10 as a clock pulse voltage $\phi 1$ via the two inverters 8 and 9. On the other hand, the inverted square-wave voltage is tapped at the output of the inverter 8 and is applied to the clock input 11 as a clock pulse voltage $\phi 2$. The elements 1, 4, 8 and 9 therefore form the clock voltage generator of the circuit in accordance with the invention.

Figure 2:
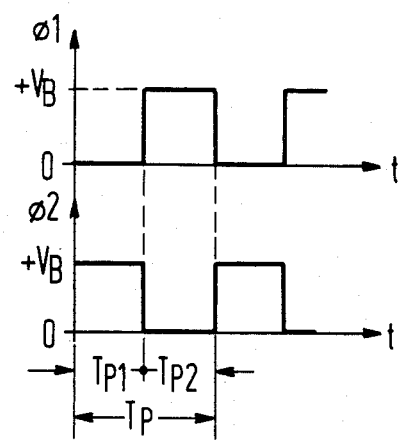
FIG. 2 is a graphic illustration in the form of a time diagram as an aid in explaining the circuit of FIG. 1.

FIG. 2 illustrates that just discussed above and shows the chronological progression of the clock pulse voltages $\phi 1$ and $\phi 2$ over a clock period $T_P$.

In the first half period $T_{P1}$ of the clock period $T_P$, the amplitude of the pulse $\phi 1$ amounts to about 0 volts, whereas the amplitude of the pulse $\phi 2$ has the value $+V_B$ as long as the supply line lies at $+V_B$ volts. The gate of the P-channel switching transistor T5 is thereby placed at 0 volts so that it becomes conductive. The n-channel switching transistor T6 whose gate has the voltage $+V_B$ applied thereto likewise becomes conductive, whereas the P-channel switching transistors T7 and T8 are inhibited because of their gates being connected to the voltage $+V_B$. As a consequence, the capacitor C1 charges to approximately the supply voltage $+V_B$ via the transistors T5 and T6. In the second half period $T_{P2}$, by contrast, the amplitude of the pulse $\phi 2$ is approximately 0 volts, whereas the amplitude of the pulse $\phi 1$ is approximately the voltage $+V_B$. The second terminal 17 of the capacitor C1 is thereby connected to the supply voltage source 1a via the conductive p-channel switching transistor T7, i.e. it is boosted to the voltage $+V_B$, whereas the first terminal 18 of the capacitor C1 is connected to the first terminal of the capacitor C2 via the conductive p-channel transistor T8 which is driven in the same manner. Since the second terminal of the capacitor C2 is at the reference potential, a series connection of the voltage $+V_B$ and the voltage applied to the capacitor C1 occurs, whereby the storage capacitor C2 is charged to about the sum voltage, i.e. the voltage $+2V_B$. The transistors T5 and T6 are inhibited during the clock half period $T_{P2}$.

It is generally applicable that a charging of the capacitor C1 to the value $+V_B$ occurs in every clock half period with $\phi 1=0$, $\phi 2=+V_B$, whereas the sum voltage of the value $+V_B$ and the voltage across the capacitor C1 in every following second half period $T_{P2}$ with $\phi 1=+V_B$, $\phi 2=0$ leads to a recharging of the capacitor C2 to the value of approximately $+2 V_B$. The capacitor C2 discharges across a load connected to the output AG, whereby the charge loss arising in the capacitor C2 due to this discharge is recompensated in every second clock half period.

As soon as the voltage at the circuit output AG exceeds the value of the supply voltage $+V_B$, the supply line 5 is switched from the value $+V_B$ to a value $V_A$ at the output AG. This occurs in such a manner that the comparator 13 which compares the voltage $V_A$ applied to its input 12 with the voltage $+V_B$ applied to its input 14 emits a logical "0" at its output 16 when $V_A < V_B$ and a logical "1" at its output 15, whereas a logical "0" is provided at the output 15 and a logical "1" is provided at the output 16 given the condition where $V_A > V_B$.

A logical "0" thereby denotes the reference potential and a logical "1" denotes the respective potential appearing at the supply line 5. The logical "0" at the output 16 switches the p-channel transistor 10 into its conductive channel and the logical "0" at the output 15 switches the p-channel transistor 9 into its conductive condition. The comparator 13 guarantees that only one of the transistors T9 and T10 is in its conductive condition. The switch-over of the supply line to the voltage $V_A$ has, as a consequence in the level converter 4, that the square-wave voltage appearing at the circuit junction 6 no longer alternates between 0 volts and the value $+V_B$ as previously described, but between 0 volts and the value $V_A$, so that the clock pulse voltages $\phi 1$ and $\phi 2$ at the clock inputs 10 and 11 also alternate between these values. It is therewith achieved that the switching transistors T5 and T6 reliably inhibit in the second clock half period $T_{P2}$, so that undesired charge losses which would diminish the efficiency of the circuit can appear at the capacitor C1 and C2.

Figure 3:
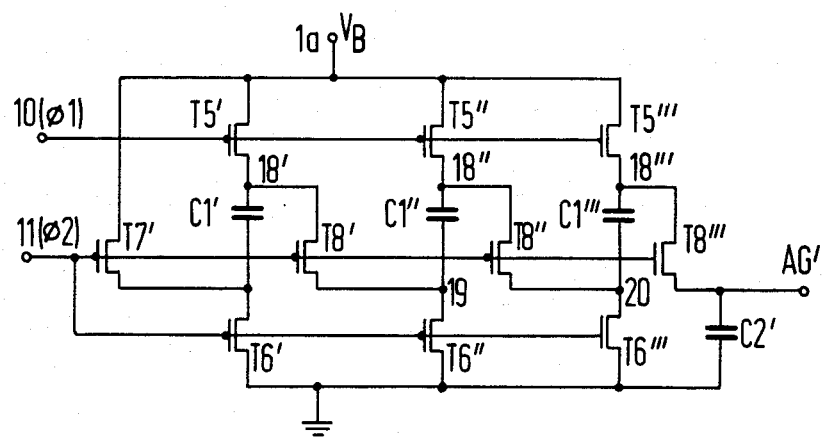
FIG. 3 is a schematic circuit diagram of a modification of the circuit of FIG. 1 for providing a higher output voltage.

Referring to FIG. 3, a further development of the circuit portion A of FIG. 1, which is employed in place of the circuit portion A, is illustrated for use when a voltage higher than the voltage $+2 V_B$ is desired at the output AG. A first circuit stage comprising a capacitor C1' and a plurality of transistors T5'–T8' is illustrated at the left side of FIG. 3 and corresponds to the circuit portion A in terms of structure and manner of operation. A second identically-constructed circuit stage comprises a capacitor C1'' and a plurality of transistors T5'', T6'' and T8'' and is connected in place of the storage capacitor C2 of FIG. 1. A switching transistor (which would have been a transistor T7'') is eliminated since the input 19 of the second stage is not connected to the voltage $V_B$, but to a first terminal 18' of the capacitor C1', namely via the switching transistor T8'. A further, identically designed circuit stage comprises a capacitor C1''' and a plurality of transistors T5''', T6''' and T8''' and follows the second stage. Again, a switching transistor (which would have been a transistor T7''') is eliminated since the output 20 of the third stage is not connected to the voltage $V_B$ but to the first terminal 18'' of the capacitor C1'' via the switching transistor T8''. The first terminal 18''' of the capacitor C1''' is connected via the switching transistor T8''' to the first terminal of a storage capacitor C2' which, at the same time, forms the circuit output AG'. The second terminal of the capacitor C2' is connected to the reference potential, here again ground.

In every half period $T_{P1}$ with $\phi 1=0$ and $\phi 2=+V_B$ or $\phi 2=V_A$, the capacitors C1', C1" and C1"' are respectively connected in parallel to the supply voltage $+V_B$, being connected thereto via the conductive p-channel switching transistors T5', T5" and T5"' driven with the pulse $\phi 1$, on the one hand, and, on the other hand, via the conductive n-channel switching transistors driven with the pulse $\phi 2$. The p-channel switching transistors T7', T8', T8" and T8"' are each inhibited, so that capacitors C1', C1" and C1"' are respectively charged to the value $+V_B$. In every following clock half period $T_{P2}$, the transistors T5', T5" and the transistors T6', T6" and T6"' are inhibited, whereas the switching transistors T7', T8', T8" and T8"' are conductive. A series connection of the capacitors C1', C1" and C1"' thereby occurs, whereby the capacitor C2' is charged to the sum voltage of the voltages across these capacitors and the supply voltage $+V_B$, i.e. to about $+4 V_B$. The capacitor C2' is, in fact, partially discharged across a load connected to the output AG', but the charge loss arising is, in turn, compensated in every clock half period $T_{P2}$ as a consequence of the described charging to the value $+4 V_B$. In general terms, a voltage of $+(n+1) V_B$ occurs at the output AG' given n circuit stages of the type described in FIG. 3.

The substrates of the p-channel switching transistors are respectively placed at the potential of the supply line 5, this not having been taken into consideration in FIG. 3 for purpose of clarity. The substrates of the n-channel switching transistors advantageously lie at the reference potential. Given a realization of the circuit in CMOS technology, the circuit is constructed, for example, on an n-conductive substrate into which individual p-conductive tubs are located and which form the substrates of the n-channel switching transistors.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A voltage multiplication circuit comprising:
   first and second capacitors;
   a voltage source for producing a supply voltage $V_B$ a reference potential;
   first and second transistors, each including a gate, connected in series across said voltage source and said reference potential with said first capacitor connected therebetween;
   third and fourth transistors, each including a gate, said third transistor connected between said first capacitor and said voltage source, said fourth transistor connected between said first and second capacitors, and said second capacitor connected to the reference potential; said second capacitor including a terminal constituting an output of said circuit;
   first and second voltage supply lines, said first voltage supply line including a terminal for receiving said supply voltage $V_B$;
   a clock pulse generator connected to and controllable via said second voltage supply line to produce in a first mode of operation clock voltage pulses alternating between said supply voltage value $V_B$ and said reference potential and in a second mode of operation clock voltage pulses alternating between an output voltage $V_A$ and said reference potential;
   fifth and sixth transistors each including a gate and connected in series between said first supply line and said output of said multiplication circuit, said second voltage supply line being connected to a circuit node connecting said fifth and sixth transistors with one another;
   a comparator including a pair of inputs, and a pair of outputs respectively connected to said gates of said fifth and sixth transistors;
   said clock voltage generator comprising a square wave generator connected to and operated by said first voltage supply line, and pulse means connected to said generator for producing opposite polarity clock pulses $\phi_1$, $\phi_2$; and
   pulse output means, including a pair of inputs respectively connected to receive the clock pulses, $\phi_1$, $\phi_2$, and alternately connecting said first capacitor ad said first and second capacitors connected in series in circuit with said first supply line and a reference for charging and discharging in response to said clock pulses $\phi_1$, $\phi_2$; and
   said inputs of said comparator respectively connected to said first supply line and said circuit output for comparing the voltages thereon and operating said fifth and sixth transistors.

2. The voltage multiplication circuit of claim 1, wherein:
   said clock voltage generator further comprises:
   a pair of outputs for said square wave generator for providing oppositely-directed pulses;
   a level converter connected to said outputs of said square wave generator and including a pair of branches connected between said second supply line and the reference;
   each of said branches comprising a p-channel switching transistor and an n-channel switching transistor connected in series therewith;
   each of said switching transistors comprising a gate;
   said gates of said p-channel switching transistors cross connected to the respective junction of the switching transistors of the opposite branch and said gates of said n-channel switching transistors connected to respective ones of said outputs of said square wave voltage generator; and
   said level converter including an output at the junction of one of its branches connected to said pulse means.

3. The voltage multiplication circuit of claim 2, wherein said pulse means comprises:
   a first inverter connected to said level converter and including an output for providing one of said clock pulses $\phi_2$; and
   a second inverter connected to the output of said first inverter and including an output for providing the other of said clock pulses $\phi_1$.

4. The voltage multiplication circuit of claim 1, wherein said pulse output means comprises:
   a first pair of switching transistors respectively connected between said first capacitor and said first voltage supply line and the reference and each including a gate respectively connected to receive the clock pulses $\phi_1$, $\phi_2$ and operable to charge said first capacitor; and a second pair of switching transistors each including a gate respectively connected to receive said clock pulses $\phi_2$ and each respectively connected between first capacitor and said first voltage supply line and between said first and second capacitors and operable to transfer the charge of said first capacitor to said second capacitor.

5. The voltage multiplication circuit of claim 1, wherein said pulse means comprises:
   a plurality of said first capacitors;
   a plurality of first pairs of switching transistors, each including a gate connected to receive a respective clock pulse $\phi_1$, $\phi_2$ and operable to connect the respective first capacitor between said first voltage supply line and the reference for charging; and
   a second plurality of switching transistors each including a gate connected to receive one of said clock pulses and operable to correct said plurality of first capacitors and said second capacitor in series between said first voltage supply line and the reference potential to transfer the charges on said first capacitors to said second capacitor.

* * * * *